US009098830B2

(12) United States Patent
Sarferaz et al.

(10) Patent No.: US 9,098,830 B2
(45) Date of Patent: Aug. 4, 2015

(54) SYSTEM AND METHOD FOR A PROCESS BROKER AND BACKEND ADAPTER BASED PROCESS INTEGRATION

(75) Inventors: Siar Sarferaz, Speyer (DE); Markus Peter, St. Leon-Rot (DE); Bernd Schmitt, Waldbronn (DE); Volker Wiechers, Neckargemund (DE)

(73) Assignee: SAP SE, Walldorf (DE)

( * ) Notice: Subject to any disclaimer, the term of this patent is extended or adjusted under 35 U.S.C. 154(b) by 437 days.

(21) Appl. No.: 13/305,076

(22) Filed: Nov. 28, 2011

(65) Prior Publication Data

US 2012/0137307 A1 May 31, 2012

Related U.S. Application Data

(63) Continuation-in-part of application No. 12/956,816, filed on Nov. 30, 2010.

(30) Foreign Application Priority Data

Oct. 24, 2011 (EP) .................................... 11186343

(51) Int. Cl.
*G06F 9/44* (2006.01)
*G06Q 10/10* (2012.01)

(52) U.S. Cl.
CPC ...................... *G06Q 10/10* (2013.01)

(58) Field of Classification Search
None
See application file for complete search history.

(56) References Cited

U.S. PATENT DOCUMENTS

| 6,208,345 | B1* | 3/2001 | Sheard et al. | 715/853 |
| 6,256,676 | B1* | 7/2001 | Taylor et al. | 709/246 |
| 6,453,356 | B1* | 9/2002 | Sheard et al. | 709/231 |
| 7,752,293 | B1* | 7/2010 | Bishop et al. | 709/223 |
| 2003/0018832 | A1* | 1/2003 | Amirisetty et al. | 709/328 |

(Continued)

OTHER PUBLICATIONS

Gurdeep Rahi et al., "e-business and Role of Middleware", Software Innovation Team, Mar. 8, 2005, 53 pages.

(Continued)

*Primary Examiner* — Shih-Wei Kraft
(74) *Attorney, Agent, or Firm* — Kenyon & Kenyon LLP

(57) ABSTRACT

A computer-implemented method for process integration may comprise providing a business logic layer that hosts business object(s), providing process broker(s), providing adapter(s) and providing a process broker handler. Each process broker may perform process integration tasks by dynamically determining whether, when and/or how routines of the business logic layer need to be integrated with routines of a second application. Each adapter may be part of a first application and implement methods to perform communication protocol specific logic. Each adapter may also be interoperable with at least one of the process brokers and one of the business objects to transform a message exchanged between the process broker and the second application from an internal format to an external format or vice versa. The process broker handler may be operable to instantiate the process broker and to instantiate an adapter stored in association with the instantiated process broker.

12 Claims, 12 Drawing Sheets

(56) References Cited

U.S. PATENT DOCUMENTS

| | | | |
|---|---|---|---|
| 2003/0093403 A1* | 5/2003 | Upton | 707/1 |
| 2003/0093479 A1* | 5/2003 | Mellen-Garnett et al. | 709/205 |
| 2004/0117428 A1* | 6/2004 | Surma et al. | 709/200 |
| 2004/0192205 A1* | 9/2004 | Bagsby | 455/39 |
| 2007/0011126 A1* | 1/2007 | Conner et al. | 706/47 |
| 2007/0011332 A1* | 1/2007 | Raghavan et al. | 709/226 |
| 2007/0265862 A1* | 11/2007 | Freund et al. | 705/1 |
| 2008/0082569 A1* | 4/2008 | Mansour et al. | 707/102 |
| 2008/0126110 A1* | 5/2008 | Haeberle et al. | 705/1 |
| 2008/0189438 A1* | 8/2008 | Zimmerer et al. | 709/246 |

OTHER PUBLICATIONS

Enterprise application integration, Wikipedia, Jul. 18, 2010, 6 pages.

Presentation "More Time for People!", Middleware Technologies and Trends, TietoEnator, Sep. 27, 2000, 34 pages.

Michal Stal, Chapter 4-Web-based Middleware, Communications of the ACM, vol. 45, issue 10, Jan. 1, 2002, pp. 105-120.

Tuomas Vanhanen, "Requirements and a framework for broker based integration in service-oriented architecture", Dec. 4, 2003, 136 pages.

European Search Report for EP Application No. 11186343.7, dated Feb. 9, 2015.

* cited by examiner

SYSTEM AND METHOD FOR A PROCESS BROKER AND BACKEND ADAPTER BASED PROCESS INTEGRATION

CROSS-REFERENCE TO RELATED APPLICATIONS

This application is a continuation in part of U.S. patent application Ser. No. 12/956,816, filed Nov. 30, 2010 (pending), and also claims priority to the European Patent Application No. 11186343.7, filed Oct. 24, 2011, the contents of both applications are incorporated herein by reference.

FIELD OF THE INVENTION

The disclosed subject matter relates to the field of computer systems and, more particularly, to a system and method for providing a process integration based on process brokers and backend adapters.

BACKGROUND AND RELATED ART

Modern enterprises typically use a lot of software systems in a system landscape. In most current system landscapes, many components are directly connected in a point-to-point connection. To facilitate communications, interfaces are developed between two systems so that a sender system can send a document to a receiver system via an interface. Those interfaces typically are hardwired into the application components and individual mappings programs. Because interfaces are required between any two systems, the growth of the number of computer systems results in a complicated network of connections. Under these conditions, managing the collaborative sharing of information is difficult. Therefore, companies face an increasing need for integration of and collaboration among their information and enterprise software systems.

Process integration has been implemented to provide a solution to this increasing need. Various systems, e.g. the "Business by Design's process agent framework PAF) are currently used for process integration. Process integration typically relies on central application servers to deal with the interplay between intra- and inter-component processes of different systems regarding modeling, transaction management, configuration, monitoring and extensibility. These central application servers, for example, (Enterprise Application Integration hubs) are connected to all systems in a system landscape, and route the exchanged messages between different systems and map the messages between the systems' formats. The communication with the central application servers is typically implemented in a message exchange framework based on SOAP/XML technology. The message exchange framework provides a platform that allows different interfaces to communicate using a uniform technology and promotes overall clarity and reduces maintenance effort. This central hub approach has several shortcomings. First, the hubs can only route a message based on the information contained in the message. Frequently, the messages don't contain enough information for correct routing decisions. Second, a source message can only be mapped into a target message format if it already contains all required information, which often is not the case as well. As a result, the sender system interfaces/messages often still have to be adapted for each receiver system Furthermore, customers keep complaining about high total cost of ownership (TCO) and high total cost of development (TCD) in operations of a process integration product.

The main reason for the complaints is that the current application servers provided by software venders have severe limitations. For example, current application servers typically lack programming model and infrastructure for remote and peer-to-peer communication that provides uniform support for all communication channels, for managing the state of conversations with remote components, or for monitoring and error handling. Further, the existing infrastructure only provides disparate solutions for some of these capabilities for some channels and gaps are closed by patch solutions. According to state-of-the art application servers used for integrating a plurality of applications into one common process workflow, the data exchange between each of said applications while executing said workflow is hub-based. This means that the application server acts as a hub for receiving and processing calls from one of said plurality of applications or from an external application and for forwarding said call to a destination application. Setting up said application server and specifying allowed communication channels supported by said application server is a time consuming process and is an obstacle for the integration of a plurality of applications within one common, complex business process or workflow.

In a further disadvantageous aspect of state-of-the art systems for process integration, said systems have difficulties in supporting multiple different communication standards such as SOAP, remote procedure calls, and the like and are therefore of limited usage if a plurality of different applications using different communication standards need to be integrated in one common workflow. Said difficulties often arise because said systems typically are based on or favor one primary communication standard, typically a message-based one. Enterprise Service Buses (ESBs), for example, favor SOAP and Web Services. As a result, supporting other (not so commonly used) standards requires a translation from the primary message format into the other one. Thus, the transformation from or to said primary standard format often is a bottleneck in terms of performance and/or in terms of data format limitations. This may reduce performance and/or result in a loss of information during the format transformation. In addition, the code for process integration is not strictly separated from the business logic. As a consequence, the task of updating or modifying the integration logic or the overall business process workflow may require amendments to multiple, distributed code sections.

Moreover, the business and integration logic is often closely interwoven such that adapting to a new integration process often requires significant changes to the core business logic as well. This leads to a higher TCD for process integration in general and the absence of a unified approach across all applications results in a proliferation of tools and configuration environments, which increases TCO considerably and inhibits scenario-driven configuration. The typical solution to separate business and integration logic uses a framework driven control flow, in which application logic is implemented in business objects and the framework calls on the business objects to perform various functions. However, the drawback of a framework approach is that any logic that does not fit into the predefined framework logic either requires a modification to the framework itself or some "creative" code to lever the limitations of the framework. As the framework drives the application, it has to have a deep knowledge on how applications are built, which contradicts the separation of concerns if the framework and applications are developed by different organizations. This also complicates the enhancement of the framework if adoptions to unforeseen use cases must be supported by the framework. Further, the hidden control logic makes it harder for untrained developers, supporters or customers to understand the overall logic.

Therefore, there is a need for a system and method that provides a communication mechanism that separates business and integration logic and reduces the cost of adding new communication channels.

SUMMARY

It is an object of embodiments of the invention to provide for an improved method, computer-readable storage medium and system for process integration. This object is solved by the features of the independent claims. Preferred embodiments are given in the dependent claims.

The expression 'business process' as used herein encompasses any processing workflow of data which may relate to the processing of business- and/or technical data and/or which may control a physically executed workflow. Processing business data or technical data may relate to any workflow comprising multiple steps and corresponding applications for processing data and forwarding the processing result to another application. Said other application may use the received data as input, process the data and forward its processing result to still a further application. A physically executed workflow may be, for example, the control of an assembly line, the control an automated sample workcell used in clinical or diagnostic laboratories or the like.

A 'business object' or 'business data object' may be any data object, e.g. an instantiated class object, a file, which is used, generated, modified or otherwise processed by program instructions of the business logic layer. According to embodiments, the task of integrating two or more applications implies integrating data contained in one of the business data objects of a first application into the business workflow of a second application or using data provided by said second application to modify in a controlled manner the data content of said business data object of the first application.

A 'distributed system landscape' is a distributed computer system comprising a plurality of applications and a central design time repository. Some of said applications may be operable to communicate with each other. An example of a distributed system landscape is the SAP business suite environment.

An 'adapter' as used herein is a software module providing an interface for exchanging data and/or sharing functions between two applications. An adapter implements the (dis) assembly of messages for remote communication into the input/output provided/expected by an associated process broker. An adapter may also take care of (de)serializing and transporting messages in channel-specific ways. In this sense, adapters implement technology-/signature-centric integration logic but no business logic. Depending on the embodiment, an adapter may be an instance of one single class or may be constituted by a plurality of classes together fulfilling the above mentioned tasks. An adapter may be responsible for outgoing or incoming communication with an external application only. According to other implementation variants, one single adapter may comprise different methods for incoming and outgoing communications respectively.

An adapter may, for example, support a particular communication standard, e.g., may support SOAP based communication, may support various XML dialects, may expose a concrete remote function call (RFC) or Enterprise Service interface or use a client proxy. Thus, an adapter may enable an application to share data and functions with another application. An outbound adapter may expose a concrete remote function call to one or more external applications. An inbound adapter may, for example, take care of de-serializing received messages that have been transmitted in channel-specific ways and the outbound adapter may take care of serializing messages and transmit them according to a particular communication standard and/or according to a particular data format. Said communication standard and/or data format specific way of sharing data and functions between application is referred herein as "communication channel specific" or "channel-specific".

Whether such program modules like adapters or process brokers are represented by a class instance or by a collection of methods may depend on the embodiment and may depend in particular on the programming language used for implementing the first application, the toolkit library and the framework.

A 'process broker' as used herein is a software module, e.g. a class instance or a set of interoperable class instances, which contains business-centric integration logic. In case of inbound communication, an inbound process broker may, for example, define a local interface to perform actions within an application required for the integration case said process broker is responsible for. According to embodiments, this interface is 'coarse grained', i.e., the interface exposes only a very limited set of parameters, thereby reducing the coupling between the two systems communicating via said adapter and easing the modification of program routines in the adapter. An inbound process broker may implement actions for process integration by calling a business logic and may also delegate handling business errors and conflicts as well as managing the state of the ongoing to a process broker handler. The inbound process broker may be the single entity that "knows" how to orchestrate the business logic to achieve the desired business result.

A 'framework' as used herein is a skeleton made of executed computer implemented routines which provide for a set of predefined functions and predefined workflows. Any application having been developed as a component of such a framework is required to make use of and/or confirm to the functions, workflows or other kinds of constraints predefined by the framework. In particular, a framework as used herein is a framework for process integration providing a backbone for any application which is to use said framework in order to provide business object data to other applications or to integrate data received from said other applications into their own business logic.

A 'toolkit library' or 'library' as used herein is a collection of prewritten classes or coded templates, any of which can be specified and used by a programmer when developing an application program. At least some of the classes of the library are operable to communicate with one or more classes or interfaces provided by the framework according to a predefined communication scheme (which does not imply that the sequence of all communication steps are predefined). The programmer specifies which classes (in an object oriented programming language) or subroutines (in procedural programming languages) are being used and furnishes data that instantiates each class as an object that can be called when the program is executed. Access to and use of a library greatly simplifies the job of the programmer since standard, pretested code is available that the programmer doesn't have to write. On the other hand, a library allows a programmer to flexibly chose and adapt the functionalities he needs for developing an application program in each individual case.

A 'meta model' as used herein is a model and description of the rules, constraints, functional components and their interrelation of a software architecture used for integrating data and functions of two or more application programs. As in the software art a plurality of different programming languages and implementation strategies exist, the meta model as used herein is a description of the core interoperability of functional modules, e.g. classes, sets of classes, methods or sets of methods of such a system specifying a developer how to implement embodiments of the invention, wherein it is the task of the developer to adapt these concepts to the particular programming language of his choice.

In one aspect, the invention relates to a computer-implemented method for process integration, the method comprising: providing a business logic layer hosting one or more business object, the business logic layer being part of a first application; providing one or more process brokers, each process broker performing process integration tasks by dynamically determining whether, when and/or how routines of the business logic layer need to be integrated with routines of a second application, wherein the one or more process brokers are part of the first application; providing one or more adapters, wherein each adapter is part of the first application and implements methods to perform communication protocol specific logic and wherein each adapter is interoperable with at least one of the process brokers and one of the one or more business objects to transform a message exchanged between said process broker and the second application from an internal format to an external format or vice versa, the internal format being interpretable by said process broker, the external format being interpretable by the second application, wherein the one or more adapters are part of the first application; and providing a process broker handler, the process broker handler being operable to instantiate the process broker and to instantiate an adapter stored in association with said process broker, wherein the process broker handler is part of a framework, said framework being part of a runtime environment, the runtime environment hosting the first application. Process integration is achieved by the interoperating adapter and process broker by executing on of the following steps: in case the message is an inbound message, using message data transformed to the internal data format to modify at least one of the business objects; in case the message is an outbound message, transforming data of the at least one business object from the internal to the external format and sending said data as the message to the second application.

Said features may be advantageous, because the business logic contained in the business logic layer is clearly decoupled from process integration logic contained in the integration layer such that the process logic doesn't have to be modified each time integration logic is to be added, extended, changed or replaced. The main components responsible for coupling the business logic to the integration logic, i.e., the process broker, the process broker handler, and the adapter are—except from the process brokers only loosely coupled to the business logic layer. The process brokers, to the contrary, typically are created by a programmer when creating the first application. As the process broker comprising business logic is not involved in any formatting issues, the process broker is generic in respect to the message format required by any of the second applications. The adapters responsible for formatting the message in dependence on the requirements of the second application program and in dependence on an internal format required by the respective process broker of the first application do not comprise any business logic and are therefore decoupled from business logic related problems. The process broker handler being part of a framework is in control of instantiating the adapters and the process brokers, thereby providing a kind of lightweight framework for process integration which is largely decoupled from the business logic of the first application and also from formatting problems resulting from the particular requirements of the first and each of the second applications which need to be integrated.

According to embodiments, each adapter is particular to a message transformation type characterized by a particular external format required by the second application and a particular internal format required by the first application and a communication event, e.g. the receipt of an incoming message or the submission of an outgoing message upon a state-change event of a business object. Said external format may be, for example, any XML variant for SOAP-based communication, a particular kind of serialized data object, a custom data format or the like.

In other words, according to embodiments an adapter being interoperable with at least one of the process brokers and one of the one or more business objects is operable to transform an external format of an inbound message received from the second application into an internal format interpretable by said process broker for modifying one of the business objects of the business logic layer based on the received data or is operable to transform data of one of the business objects from an internal data format to an external data format of a generated outbound message to be sent to said second application.

In a further advantageous aspect, said features may provide for a highly flexible system wherein the business process handler is operable to dynamically instantiate the adapter and the process broker as needed given a particular communication context.

According to embodiments, the logical coupling between business logic and process integration logic may slightly differ for inbound communication, asynchronous outbound communication and synchronous outbound communication. As the format-specific adapter is dynamically and flexibly assigned to a particular process broker, integration logic is decoupled from the business process logic of the business logic layer.

The features that the adapters and process brokers are part of the first application while only the process broker handler is part of the framework is advantageous, as this distribution of responsibilities allows a programmer programming the classes and methods of the first application including the business logic classes, adapter classes and process broker classes, to flexibly adapt the formatting and control of the business process integration workflow according to the particular requirements of the business logic. The process broker handler being part of the framework executes only some basic tasks of process integration, in particular the instantiation of the adapters and the process brokers, thereby providing for a lightweight and highly flexible framework for process integration which does not force the application programmer to design the application according to a predefined workflow schema for process integration or to generate 'creative code', e.g., to bypass or work around the predefined workflow schema.

Depending on the embodiment, the framework may be an integral part of the runtime environment of the first application used for process integration with one or more second applications. The framework may likewise be a component which can be added and/or removed from the framework individually, e.g. a plug-in or add-in component of the framework.

According to embodiments, each adapter instance comprises exactly one process broker instance. Thus, the adapter may wrap its process broker and expose the services provided by the business logic of its process broker instance to other application programs.

According to further embodiments the method further comprises the steps of: providing, by the framework, an abstract broker class; for developing the first application, using the abstract broker classes as superclass from which the one or more brokers inherit methods, method subs, and/or constants. The expression 'abstract class' can define an interface providing for some pre-implemented routines or can define a pure interface without providing any implementation. The expression 'superclass' and the concept of inheriting methods, method stubs or constants from a super-class as used herein should not be understood as being limited to a particular concept of inheritance as used for example in the programming language Java. A person skilled in the art is well aware that different programming languages, e.g. Ruby, C++ or others use different approaches of reusing methods, parameter values and/or overall class structures of a 'superclass' in a plurality of inheriting 'subclasses'. Any of said approaches provided in a programming language to inherit or reuse data structures, methods and/or parameters already defined in a kind of superclass which may or may not be instantiable will herein be subsumed under the concept of reusing methods, method stubs and constants of an 'abstract class' or 'abstract superclass'. Said feature is advantageous as the abstract superclass is 'known' to classes and routines of the lightweight framework and the various process brokers actually part of the first application can thereby addressed by the framework without implementing a strong coupling between the framework and the first application.

According to preferred embodiments, the method further preferentially comprises the step of: providing a toolkit library comprising generic adapters and/or utility classes, a generic adapter being an adapter for transforming the internal message format to and/or from a generic external format, the generic external format being used by more than two second application programs for communication, the utility classes assisting at least one of the adapters and/or process brokers in executing their tasks; and for developing the first application, including said one or generic adapters and/or utility classes into the first application. Said features may be advantageous as they make the programming of the first application more efficient. The toolkit library assists the programmer in designing adapters and process brokers being interoperable with the process broker handler of the lightweight framework.

Providing a generic adapter by means of the tool kit library may be advantageous, because generic adapters may be reused for communication with a plurality of different second applications. For example, a generic adapter may be an e-mail adapter being operable to transform data contained in an internal data format into an email format or to process an incoming email and transform the content into a data object having the three fields 'sender', 'subject' and 'mail-body' according to the internal format.

According to embodiments, the code library comprises a plurality of templates, wherein a template is any kind of file or data structure which provides a programmer developing an application one or more classes comprising method stubs in accordance with the core structure of adapters and/or process brokers of various kinds. Depending on the embodiment, there may be different adapters and process brokers and corresponding templates for inbound and outbound communication. According to further embodiments, different adapters and process brokers for synchronous inbound, asynchronous inbound, synchronous outbound and asynchronous outbound communication may be used. Accordingly, the toolkit library may provide the programmer with 4 or even more template types for said adapter and process broker types. Said features may be advantageous because the time for developing an application which can be integrated into a distributed system framework may tremendously be reduced, and the programmer is assisted in programming in accordance with the interfaces of the framework.

In a further advantageous aspect, the toolkit library allows a programmer to flexibly implement any kind of communication channel and any kind of control flow for data and process integration. In many state-of-the-art systems, framework driven process integration is employed which is harder to understand for a developer, makes static code analysis more difficult and does not allow to control the integration flow by the developer/the developed application but rather delegates the control flow to the framework. To the contrary, according to embodiments of the invention the control flow of the process integration lies on the side of the application and is thus under the control of the developer using the toolkit library. Much more complex process integration scenarios can such be implemented and realized.

According to one embodiment the provided business logic layer of a manufacturing control application comprises instructions for controlling a workflow for manufacturing a sample tube. Each sample tube and its current manufacturing state may be represented in the business logic layer by a business object, i.e., a data object such as an instantiated class 'sample_tube'. A programmer may have defined sample_tube classes and other classes for modeling and controlling the production workflow. This workflow may foresee a check guaranteeing that a label is printed on the sample tube only in case the tube surface passes a quality check, i.e., does not comprise any irregularities, e.g., depressions or protrusions. Said check is executed by an external device which comprises a checking unit with a camera and a processing unit for exchanging data with the manufacturing control application. The sample tube data object may throw an event upon having reached a predefined state within the workflow. One particular process broker having been specified by the developer with the help of the toolkit library as a class instance registering said event may evaluate the event-throwing business data object to determine if the sample tube represented by said business object is ready for being evaluated in said quality step for attaching the label to it in case of the tube passing the check. Thus, the registered process broker is an inherent part of the business logic and may be able to evaluate data provided by the business object without any transformation of formats. Said process broker is instantiated by a process broker handler listening for this kind of event. Thus, the decision which process broker should be instantiated is executed by the framework comprising the listening process broker handler, but the time of throwing the event and the method how data of the business data object having thrown the event is implemented by means of the toolkit library. Thus, the process broker handler determines the outbound process broker having registered for the occurred event and also determines an outbound adapter. The determined outbound adapter must be operable to transform data of the sample tube data object having thrown the event from the internal format of the determined outbound process broker to the external format of the external application program running on the device executing the quality test. For example, said device may require the sample tube type and a sample tube ID as input and may require the data to be provided in a particular XML format. The process broker handler determines one of the adapters being able to transform at least the required data of the tube data object into said XML format. The adapter receives from the process broker having registered for said event a pointer to the sample tube data object having thrown the event and accesses said data object via said pointer to execute the format transformation. The creation of the message comprises: calling, by the process broker handler, the execute method of the determined outbound process broker; invoking, by the called outbound process broker, a method of the determined outbound adapter, said invoked method creating the message to be sent to the second application program. Said message comprises the business logic layer data of the tube data object. The external system receiving said message may trigger the physical transport of the corresponding sample tube to the checking unit for executing the quality check. The result of the quality check may be returned to the manufacturing control application and integrated into the business logic of said application via inbound adapters. The result of the quality check may be used to update the status of the sample tube data object, thereby modifying the further execution of the business logic as to allowing or prohibiting the corresponding tube labeling unit in dependence on said result. Thus, the status of a tube data object is synchronized with the physical tube object it represents by sending outbound messages in dependence on events thrown by the tube data object and by receiving inbound messages resulting in a modification of the status of the tube data object and a corresponding change in the execution of the manufacturing workflow.

Finally, the determined outbound process broker, performs error handling and process book-keeping when the adapter creates and transforms the message. According to embodiments, the process broker handler instantiates the process broker and the corresponding adapter if required.

According to embodiments, an integrated development environment (IDE) is provided which is operable to automatically generate code artifacts based on said templates. Said IDE may in addition be operable to deploy the generated application to the runtime environment comprising the framework. Said feature may be advantageous as they may accelerate the programming process and assist in integrating the business process of the first application according to the requirements of the lightweight framework.

According to embodiments, inbound adapters for SOAP based web services, RFC calls, IDOC and other protocols are provided for executing inbound communication. The main task of an inbound adapter may be to map a communication protocol specific external message format to the second interface of the inbound process broker. The inbound process broker used for asynchronous communication may expose, for example, an ABAP OO interface that defines according methods such as 'createSalesOrder( )'. Thus, triggering the business logic, performing error handling and processing book-keeping are in charge of the asynchronous inbound process broker. For specific integration scenarios, key mapping, asynchronous-asynchronous bridging or other aspects would be implemented in an asynchronous inbound process broker.

According to embodiments, the process broker handler implements a plurality of process integration services including a routing service and a mapping service, the routing service being adapted for automatically determining to which of a plurality of second application programs the outgoing communication is to be directed, the mapping service being adapted for determining, for the determined second application program, the external format required by said determined second application program for interpreting the message. The process broker handler is operable to dynamically instantiate one of the one or more process brokers and one of the one or more adapters in dependence on the dynamically generated result of the routing service and the mapping service.

In other words, the process broker merely 'routes' the call by deciding if, when and to whom a message should be communicated, and may provides an adapter appropriate to adapt the message to the format of the recipient with a pointer to the business object comprising the data to be communicated. In case the process broker should have assigned multiple adapters, the process broker may also consolidate the message-parts provided by each of said adapters and decide if any communication errors can be tolerated from a business perspective.

According to embodiments, the process broker handler may access a first data structure comprising a first assignment between events thrown by a particular business object and a process broker identifier. Said assignment may be created, for example, by a plurality of process brokers registering for said event. The process broker handler may further be operable to access a second data structure comprising a second assignment between a process broker identifier and an adapter identifier. Such an assignment may be specified by the developer having created the first application. The first and second data structures may by any kind of data structure provided by the tool kit library or by the framework, in particular files, database tables, and the like. Said features may be advantageous as they may allow the process broker handler to dynamically determine which process broker to instantiate for a given event and the communication partner involved in a communication corresponding to or being triggered by said event; further they may allow the process broker handler to dynamically determine which adapter to instantiate for executing said communication with said determined communication partner, e.g. another application program running on a remote computer and being connected via a network. According to other embodiments, the lookup of the first data structure may be implemented based on a process of event registering and event listening as provided by some programming languages.

According to further embodiments, for executing the inbound communication one of the adapters is responsible for controlling the sequence and type of data processing operations of said inbound communication. Said features may be advantageous as an inbound adapter is the first one to receive the inbound message (no hub structure for inter-application communication is required according to embodiments of the invention). In addition, integrating the decision if and what to do with the inbound message in the adapters thus reduces the intra-application communication overhead.

According to further embodiments for executing an inbound communication the method further comprises the steps of: receiving the message from the second application via an interface of an inbound adapter, the inbound adapter being one of the one or more adapters; transforming, by the receiving inbound adapter, the external format of the received message to internal format required by an internal interface of an inbound process broker, the inbound process broker being one the one or more process brokers; transferring the transformed message from the receiving inbound adapter to said inbound process broker; invoking, by said inbound process broker, a business method of one of the business objects; performing, by said inbound process broker, error handling and process book-keeping of the invoked business method.

According to further embodiments, the method further comprises the step of: notifying, by the receiving inbound adapter, the process broker handler on the receipt of the message; and controlling, by said inbound adapter, the processing of the received message and the integration of the received message into the business logic layer. This is advantageous as the notification on the received inbound message enables the process broker handler to instantiate a corresponding process broker being adapted to further process the formatted message.

According to further embodiments, for asynchronous outbound communication the following steps are executed: registering, by one or more outbound process brokers belonging to the one or more process brokers, for one or more 'interested events' (also referred to as 'events') thrown in the business logic layer, wherein each registering outbound process broker comprises an execute method; listening, by the process broker handler, to the one or more events to determine whether any of the events has occurred; when any of the events occurs, determining, by the process broker handler, the at least one outbound process broker having registered for the occurred event and determining, by the process broker handler, an outbound adapter being operable to transform the message from the internal format of the determined outbound process broker to the external format of the second application program, the outbound adapter being one of the one or more adapters; invoking, by the process broker handler, the execute method of the determined outbound process broker; invoking, by the outbound process broker, a method of the determined outbound adapter, said invoked method creating the message to be sent to the second application program from business logic layer data; and performing, by the determined outbound process broker, error handling and process book-keeping when the adapter creates and transforms the message. According to embodiments, the process broker handler instantiates the process broker and the corresponding adapter if required.

Said features are advantageous, as only one single format transformation step is required for sending out a business-logic event based message to another application program. In state of the art systems lacing a clear separation of business logic and formatting, data provided by one of a plurality of business objects need to be transformed multiple times depending on which business object provides the data in which module of the application program. As according to embodiments of the invention each business object may directly have assigned a corresponding process broker, multiple application-internal transformation steps are avoided.

According to further embodiments, the outbound process broker when invoking the method of the determined outbound adapter forwards a pointer to the business object having thrown the occurred interested event, and wherein the outbound adapter accesses the business object via said pointer to retrieve data of the business object used for creating the message. This feature may be advantageous as by forwarding only a pointer to a data object and not the data object itself helps to keep the adapter logic and the process broker logic separated from each other and to avoid additional format transformation steps which might be required for forwarding a real data object.

According to further embodiments, the interested events are selected from a group comprising: a status attribute change event of the business object, and a save event of a transaction manager, the transaction manager being part of the business logic layer and being responsible for managing transactions executed in the business logic layer, each of the save events being an event of storing data provided by the business logic to a storage medium.

According to further embodiments, the process broker handler instantiates the determined outbound process broker and the determined outbound adapter in case the interested event occurs.

According to further embodiments, for executing a synchronous outbound communication the method further comprises the steps of: invoking, via a call submitted by a routine of the business logic layer to the internal interface of one of the outbound process brokers, a method of said one outbound process broker; and upon receipt of said call, invoking, by said one outbound process broker, a method of one of the outbound adapters, thereby causing said outbound adapter to generate the message by transforming data of the business object submitted with the request into the external format.

According to further embodiments, for executing the outbound communication, one of the outbound process brokers is responsible for controlling the sequence and type of data processing operations of said outbound communication.

According to further embodiments at least some parts of the control of the data processing is uniformed by code templates, each code template being selected from a group comprising:

- a code template for a synchronous outbound adapter,
- a code template for a synchronous inbound adapter,
- a code template for an asynchronous outbound adapter,
- a code template for an asynchronous outbound adapter,
- a code template for a synchronous outbound process broker,
- a code template for a synchronous inbound process broker,
- a code template for an asynchronous outbound process broker,
- a code template for an asynchronous outbound process broker, and
- a code template for an assignment manager, the assignment manager providing means for assigning one of the process brokers to one of the adapters wherein the mapping service of the process broker handler is operable to access said assignment for determining the required adapter.

According to preferred embodiments, the code templates are provided via the tool kit library and used by an IDE to automatically create stub code of the respective adapter and process broker class files.

In a further aspect the invention relates to a computer-readable non-transitory storage medium comprising instructions which, when executed by a processor, cause the processor to execute the steps of anyone of the methods mentioned previously.

In a further aspect the invention relates to a processing system for process integration, the processing system comprising: a runtime environment, the runtime environment comprising a framework; a first application comprising a business logic layer, the business logic layer being operable to host one or more business objects, the runtime environment being operable to host the first application; one or more process brokers, each process broker being operable to perform process integration tasks by dynamically determining whether, when and/or how routines of the business logic layer need to be integrated with routines of a second application, wherein the one or more process brokers are part of the first application; one or more adapters, wherein each adapter is part of the first application and implements methods to perform communication protocol specific logic and is interoperable with at least one of the process brokers and one of the one or more business objects to transform a message exchanged between said process broker and the second application from an internal format to an external format or vice versa, wherein said process broker is operable to interpret the internal format and wherein said external format is interpretable by the second application, wherein the one or more adapters are part of the first application; and a process broker handler, the process broker handler being operable to instantiate the process broker and one of the adapters stored in association with said instantiated process broker, wherein the process broker handler is part of the framework, said framework being part of the runtime environment; a memory to store computer program instructions; and a processor configured to execute the computer program instructions, thereby providing the runtime environment and the first application, wherein in case the message is an inbound message, the adapter and the process broker interoperatively are operable to use the message data transformed to the internal data format to modify at least one of the business objects; and wherein in case the message is an outbound message, the adapter and the process broker interoperatively are operable to transform data of the at least one business object from the internal to the external format and is adapted for sending said data as the message to the second application.

In a further aspect, the invention relates to a non-transitory computer-readable storage medium embodied with program instructions for causing a computer to execute a method for local process integration, the method comprising: providing a business logic layer to host at least one business object; providing a process broker that exposes a coarse grained interface and performs process integration tasks; providing an adapter, wherein the adapter implements logical methods to perform protocol specific logic and collaborates with the process broker and the business object to transform a message between internal and external format; and providing a process broker handler to instantiate the process broker and adapter, wherein the process broker handler implements a plurality of process integration services including routing and mapping.

In a further aspect, the invention relates to a processing system or 'apparatus' for local process integration, comprising: a memory to store computer program instructions; and a processor configured to execute the computer program instructions to: provide a business logic layer to host at least one business object; provide a process broker that exposes a coarse grained interface and performs process integration tasks; provide an adapter, wherein the adapter implements logical methods to perform protocol specific logic and collaborates with the process broker and the business object to transform a message between internal and external format; and provide a process broker handler to instantiate the process broker and adapter, wherein the process broker handler implements a plurality of process integration services including routing and mapping. The term 'local process integration' as used herein implies that the integration is executed 'locally', i.e., by means provided by elements of the first application and the lightweight framework, not necessarily by a central hub.

In a further aspect, the invention relates to a computer implemented method for local process integration, the method comprising: providing, by a computer processor, a business logic layer to host at least one business object; providing, by the computer processor, a process broker that exposes a coarse grained interface and performs process integration tasks; providing, by the computer processor, an adapter, wherein the adapter implements logical methods to perform protocol specific logic and collaborates with the process broker and the business object to transform a message between internal and external format; and providing, by the computer processor, the process broker handler to instantiate the process broker and adapter, wherein the process broker handler implements a plurality of process integration services including routing and mapping. A 'logical method' as used herein refers to any program routine and logic specified by computer interpretable instructions and executable by a processor.

According to embodiments of the above method, apparatus and storage medium, for inbound communication, the adapter maps the external format to the internal format according to an internal interface of the process broker, the broker invokes a business method of the business object and performs error handling and process book-keeping.

According to embodiments of the above method, apparatus and storage medium, for inbound communication, the adapter is responsible for control flow while the process broker handler provides generic services, the control flow orchestration is uniformed by code generation.

According to embodiments of the above method, apparatus and storage medium, for asynchronous outbound communication, the process broker defines an execute method and registers interested events and the process broker handler listens to determine whether any interested event has occurred, when an interested event occurs, the process broker handler invokes the execute method of the process broker, the process broker invokes a logical method of the adapter and performs error handling and process book-keeping.

According to embodiments of the above method, apparatus and storage medium, the interested events include: a status attribute change event of the business object, and a save event of a transaction manager. An attribute change event is any event thrown upon a change of an attribute value of the business object. The transaction manager may be a class of the business logic layer which writes business related transaction data upon successful execution of a transaction to a storage medium.

According to embodiments of the above method, apparatus and storage medium, for synchronous outbound communication, the business object invokes a logical method of the process broker with application specific request, the process broker in turn invokes a logical method of the adapter, the adapter transforms the request to the external format.

According to embodiments of the above method, apparatus and storage medium, for outbound communication, the process broker is responsible for control flow while the process broker handler provides generic services, the control flow orchestration is uniformed by code generation.

BRIEF DESCRIPTION OF THE DRAWINGS

In the following embodiments of the invention are explained in greater detail, by way of example only, making reference to the drawings in which.

DETAILED DESCRIPTION

Embodiments of the present invention may provide a local process integration component to facilitate process integration. The local process integration component may include an adapter, a process broker and a process broker handler. The process broker may collaborate with the business logic to perform business-centric integration logic (e.g. to decide when integration is necessary), and with adapters for interface mapping. The framework is based on a toolkit and generator approach. For inbound communication, the adapter is responsible for control flow while the process broker handler provides generic services. For outbound communication, the process broker is responsible for control flow while the process broker handler provides generic services. The control flow orchestration is uniformed by code generation based on templates. The templates may be provided by the toolkit and/or by an IDE customized for the development of applications to be integrated with external application based on said toolkit.

A process broker collaborating with the business logic is a process broker that provides data to or retrieves data from the business logic in a defined manner in order to achieve an integration of said data in the first and a second application.

Figure 1:
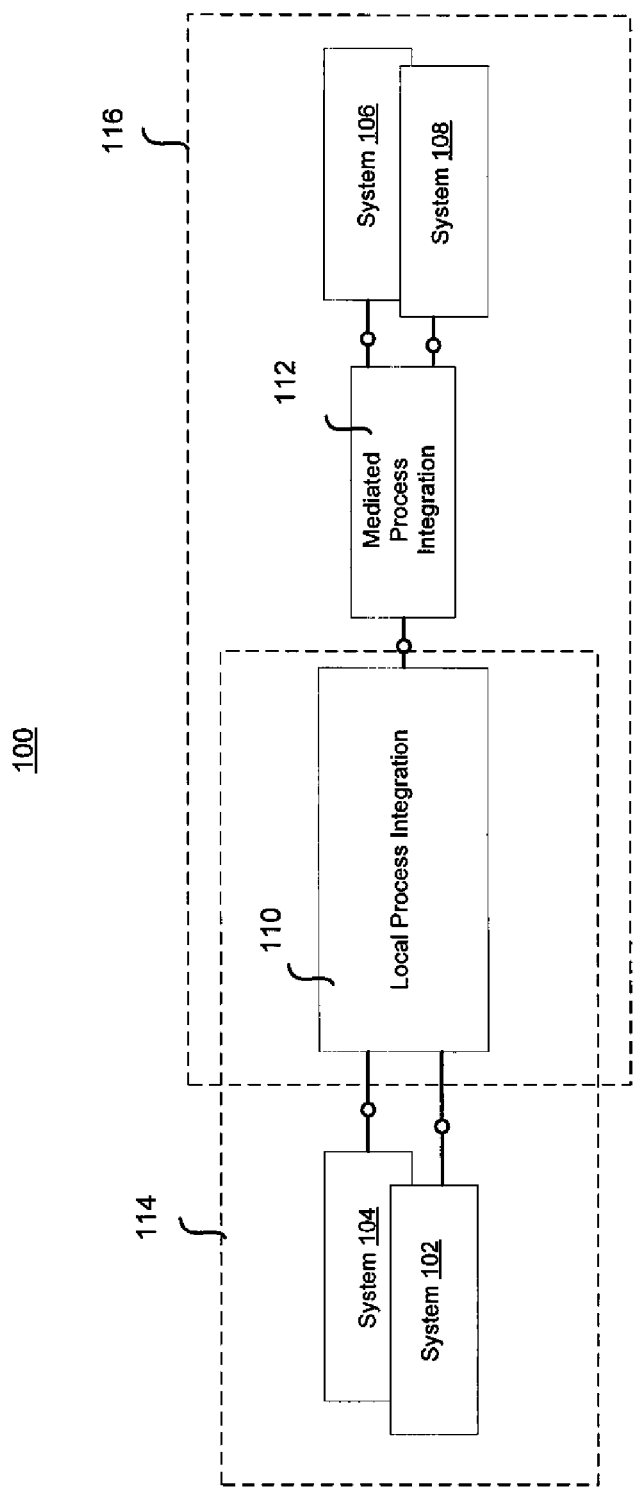
FIG. 1 illustrates an exemplary process integration system landscape according to an embodiment.

FIG. 1 illustrates an exemplary system landscape 100 according to an embodiment. The system landscape 100 may comprise a plurality of systems 102, 104, 106 and 108. The systems 102, 104, 106 and 108 may run applications from different software vendors and provide different services (e.g., data storage, document storage, report generation, customer relationship management). The systems 102 and 104 may be integrated in a point-to-point integration 114 using a local process integration component 110. The systems 106 and 108 may be integrated in a mediated integration 116 using a mediated process integration hub 112. Via the mediated process integration hub 112, the systems 102 and 104 may also be integrated with the systems 106 and/or 108.

In one embodiment, the local process integration component 110 may be implemented as part of a communication stack of an application server. Accordingly, communication messages between the sender and receiver may conform to a protocol defined by the local process integration component 110. Thus, any systems that run the application with the local process integration component 110 may communicate with each other in a point-to-point manner. The mediated process integration hub 112 may be a full process integration hub (e.g., middleware like SAP NetWeaver Process Integration) including message translation to facilitate communication between diverse systems.

Figure 2:
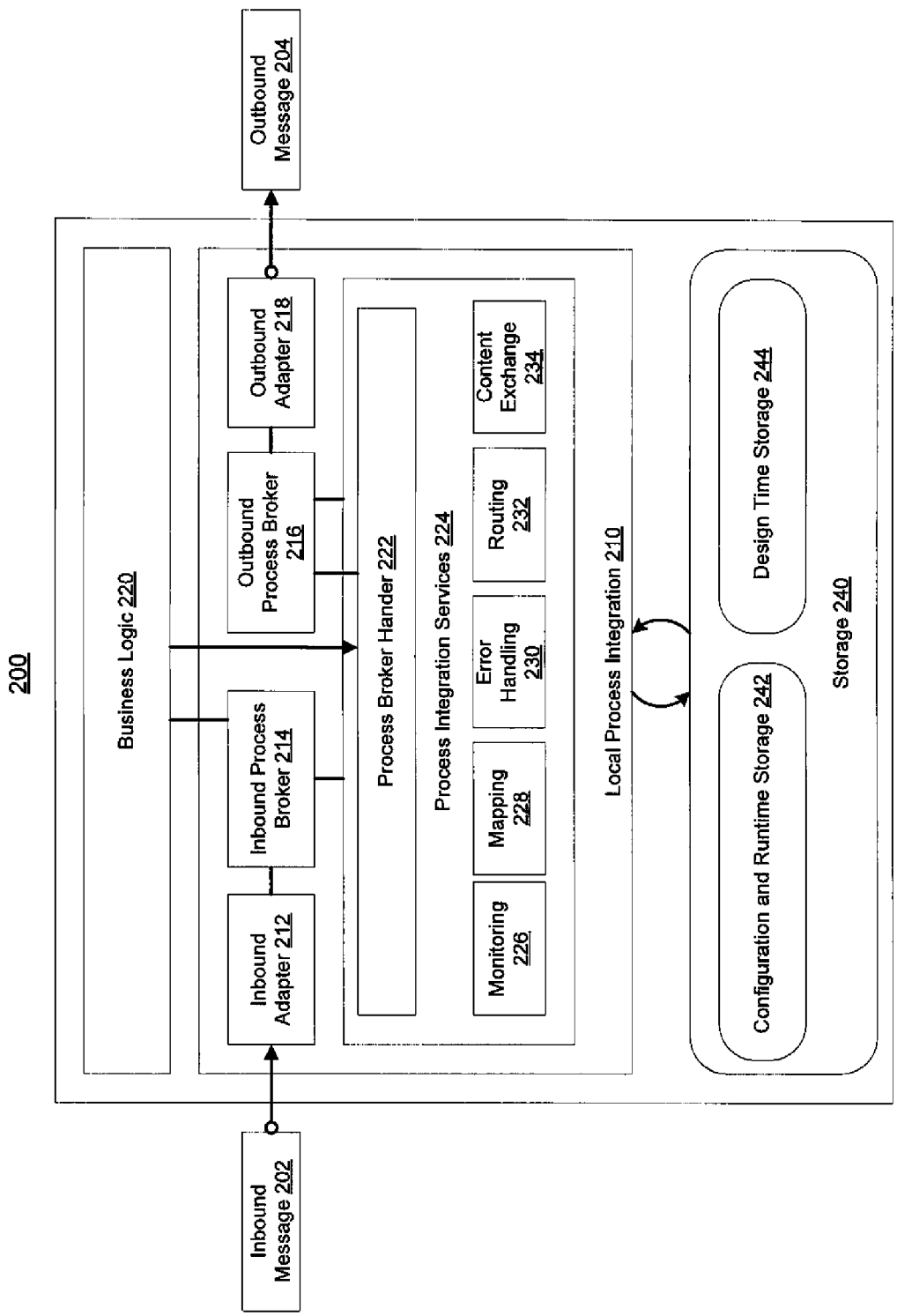
FIG. 2 illustrates a block diagram of an exemplary system according to an embodiment.

FIG. 2 illustrates a block diagram of an exemplary system 200 according to an embodiment. The system 200 may comprise a local process integration 210, business logic 220 and a storage 240. The local process integration 210 may comprise an inbound adapter 212, an inbound process broker 214, an outbound process broker 216, an outbound adapter 218 and process integration services 224. The process integration services 224 may comprise a process broker handler 222 and a plurality of process integration services: monitoring service 226, mapping service 228, error handling service 230, routing service 232 and content exchange service 234. The storage 240 may comprise a configuration and runtime storage 242 and a design time storage 244.

The system 200 may receive an inbound message 202 by the inbound adapter 212 and send an outbound message 204 by the outbound adapter 218. The adapters 212 and 218 may provide or consume remote interfaces of the communication technologies and with the signatures needed to be callable by (e.g., for inbound) or call (e.g., for outbound) different external applications. For example, an adapter may expose a concrete remote function call (RFC) or Enterprise Service interface or use a corresponding client proxy. Adapters may implement the logic to assemble or dissemble the messages for remote communication into the input/output provided/ expected by associated Process Brokers. For example, the inbound adapter 212 may take care of de-serializing received messages that have been transmitted in channel-specific ways and the outbound adapter 218 may take care of serializing messages and transmit them in channel-specific ways. Accordingly, the adapters may implement technology-/signature-centric integration logic.

Process brokers 214 and 216 may contain the business-centric integration logic. In case of inbound communication, the inbound process broker 214 may define a local, coarse grained interface to perform the actions within the application required for the integration case it is responsible for. The inbound process broker 214 may implement these actions by calling the business logic 220. The inbound process broker 214 may also delegate handling business errors and conflicts as well as managing the state of the ongoing conversation to the process broker handler 222. The inbound process broker 214 thus may be the single entity that knows how to orchestrate the business logic to achieve the desired business result. The associated inbound adapter 212 may wrap the inbound process broker 214 and expose the services provided by the business logic to other systems.

In one embodiment, the synchronous outbound communication may be implemented differently from the asynchronous outbound communication. For synchronous outbound communication, the business logic 220 may define a local interface containing the parameters needed for the remote process to be called, and the parameters it expects in return. The outbound process broker 216 may implement the interface. The business logic 220 then may call the outbound process broker 216 at the appropriate time and code point. Accordingly, part of the process integration logic thus may reside in the business logic 220: the decision where/when to integrate. The outbound process broker 216 may "route" the call (who to communicate with) to use appropriate adapter(s) (e.g., the outbound adapter 218 or other outbound adapters not shown), consolidate the result if multiple adapters are called, and decide if communication errors can be tolerated from a business perspective. The involved adapter(s) may also implement the interface defined by the business logic 220.

In case of asynchronous outbound communication, the business logic 220 does not trigger the outbound process broker 216. Instead, when a transaction is about to be completed, the business logic layer generates a generic event that triggers the process broker handler 222. The event may contain the information modified in the current transaction (e.g., Business Object (BO) instances being modified) and e.g. values of their Status & Action Management (S&AM) status variables. The process broker handler 222 may call any brokers (e.g., outbound process broker 216) subscribed to this event for selected BO types and status values, and calls them passing references to the modified BO instances. Each broker (e.g., outbound process broker 216) may translate the event into a data object comprising the semantically relevant data from the perspective of its remote process. In other words, each broker may decide whether the BO instance modification mandates communication with the remote process, who runs the latter, and which kind of action to communicate (e.g. create, update or cancel). The broker may use the appropriate adapters (e.g., the outbound adapter 218) for communication, passing references to the modified BO instances. The adapters may use the references to assemble the required messages for remote communication and to transform the message in the format required by the remote application.

In case of asynchronous outbound communication, business logic and process integration logic may be fully separated. Brokers and adapters, however, may retrieve information from the business logic 220 to make their decisions respectively to assemble the messages. The information is not actively passed to them. In one embodiment, passing BO references to the adapters in asynchronous outbound communication has the advantage that message assembly is directly based on the BO data. There is no intermediate "message" structure limiting the information available for message assembly.

The process broker handler 222 may be responsible for instantiating process brokers and adapters. It may also provide (access to) generic services of the process integration services 224 for use in broker and adapter implementations, such as the mapping service 228, error handling service 230, routing service 232 (e.g., who to communicate with). The process broker handler may also provide generic services for the management of process integration (conversation) state. The process broker handler 222 may also provide receiver and adapter determination services to determine to which address and how to communicate with external systems. The routing service 232 and receiver and adapter determination may be used for a point-to-point communication with other systems as shown in FIG. 1. It should be noted that mediated process integration based on an integration hub can still be used and even a mixture of both options.

The configuration and runtime storage 242 of the storage 240 may store configuration data and integration/conversion data. The design time storage 244 of the storage 240 may store integrated models, broker and adapter registration.

In one embodiment, the architecture shown in FIG. 2 may be complemented with a model-driven development process, resulting in integrated models. These models may be used for a scenario-driven, wizard-based configuration and integration process monitoring. The content exchange service 234 may allow exporting these models, including interface definitions, into an Enterprise Services Repository or full process integration hub, and importing corresponding content (e.g. external service definitions) into an application. The content exchange service 234 may also facilitate shipping remote APIs older systems lack, and deploying them as add-ons to such systems in a customer landscape.

In one embodiment, the business logic 220 may be decoupled from the process integration logic, such that the business logic 220 doesn't have to be touched each time integration logic is to be added, extended, changed or replaced, and such that the business logic 220 doesn't have to be touched each time a new kind of output channel is to be supported. However, the decoupling may not lead to process inconsistencies. When process integration logic is triggered to inform another process instance of a change, the information passed must be consistent with the triggering process or BO instances' state. To ensure both decoupling and consistency, a defined contract between business logic and process integration logic may be required. In one embodiment, since the process brokers' exact responsibilities may depend on the communication direction and whether it is synchronous or asynchronous, the contract may also depend on the same characteristics.

Figure 3:
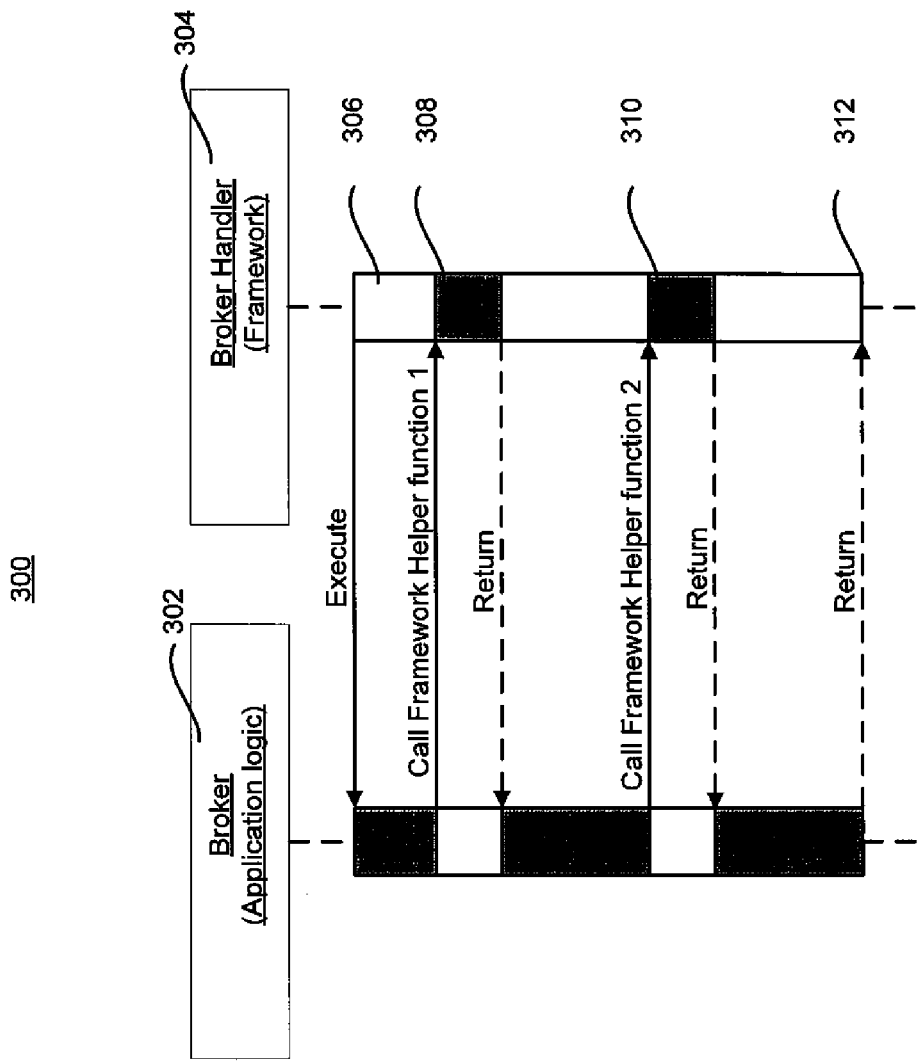
FIG. 3 illustrates a sequence diagram of an exemplary system according to an embodiment.

FIG. 3 illustrates a sequence diagram 300 of an exemplary system according to an embodiment. The sequence diagram 300 may depict a business flow showing interactions of a broker 302 and a broker handler 304. The broker 302 may represent application logic and the broker handler 304 may represent a framework that the application logic is executed in. As shown in FIG. 3, the broker handler 304 may pass the control of the flow to the broker 302 by invoking an execute method at step 306, the broker 302 may take over the flow by calling a framework helper function 1 at step 308 and calling a second framework helper function 2 at step 310. When the broker 302 finishes the process, it may return at step 312.

The sequence diagram 300 may represent an application driven process integration. In situations where the business and integration logic may be closely interwoven, adapting to a new integration process may require changes to the core business logic as well. The sequence diagram 300 may be implemented in a toolkit and generator approach. This approach may be based on three key technologies: a lean and small basic framework; a class library that allows an application developer to communicate with the framework; and a comprehensive development environment that generates code artifacts for common application pattern based on rule templates.

Figure 4:
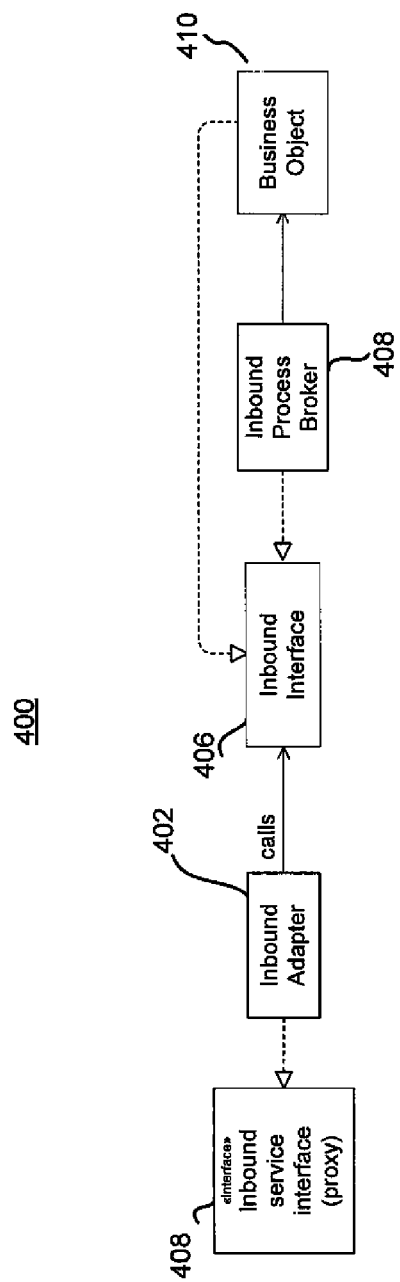
FIG. 4 illustrates a meta model for inbound communication according to an exemplary embodiment.

FIG. 4 illustrates a meta model 400 for inbound communication according to an exemplary embodiment. For inbound communication, the business logic does not have to comply with a process integration specific contract. Inbound process brokers may be seen as equivalent to the User Interface. The business logic may adhere to the standard transaction contract. For example, the business logic may not perform intermediate database updates or cannot define the end of a transaction itself. In addition, the business logic may have to return error information clearly and consistently to the inbound process brokers. This allows the inbound process brokers to react appropriately in case of errors (i.e. rollback, and either return errors to the remote caller or trigger Forward Error Handling in a subsequent logic unit of work (LUW)), and to ensure consistency itself.

The meta model 400 may comprise an inbound service interface 408, an inbound adapter 402, an inbound interface 406, an inbound process broker 408 and a business object 410. The inbound service interface 408 may expose services provided by an application to external systems. Further, the inbound service interface 408 may be remote interfaces of the communication technologies and defined based on communication protocols (e.g., services/SOAP, RFC, Electronic Data Interchange (such as Intermediate Document (IDOC)) and other protocols are provided). The inbound adapter 402 may implement logic to map the protocol specific external message format to the internal interface. The inbound interface 406 may define methods that may perform one or more business processes (e.g., createSalesOrder). The inbound process broker 408 may be a class defined in a corresponding programming language that defines the business logic of the inbound interface 406. The business logic may invoke methods of the business object 410. Further, inbound process broker 408 may perform error handling and process bookkeeping. In one embodiment, the inbound process broker 408 may also handle integration tasks, such as, but not limited to, key mapping, synchronous-asynchronous bridging or other aspects.

In one embodiment, the business object 410 may be implemented in the business logic 220 of the system 200 and represent an example of a plurality of business objects provided in the business logic 220. In another embodiment, the business object 410 may provide interfaces similar to those in service-oriented architecture (SOA) and then the inbound process broker 408 may be simplified (e.g., reduced to error handling and sync-async bridging).

Figure 5:
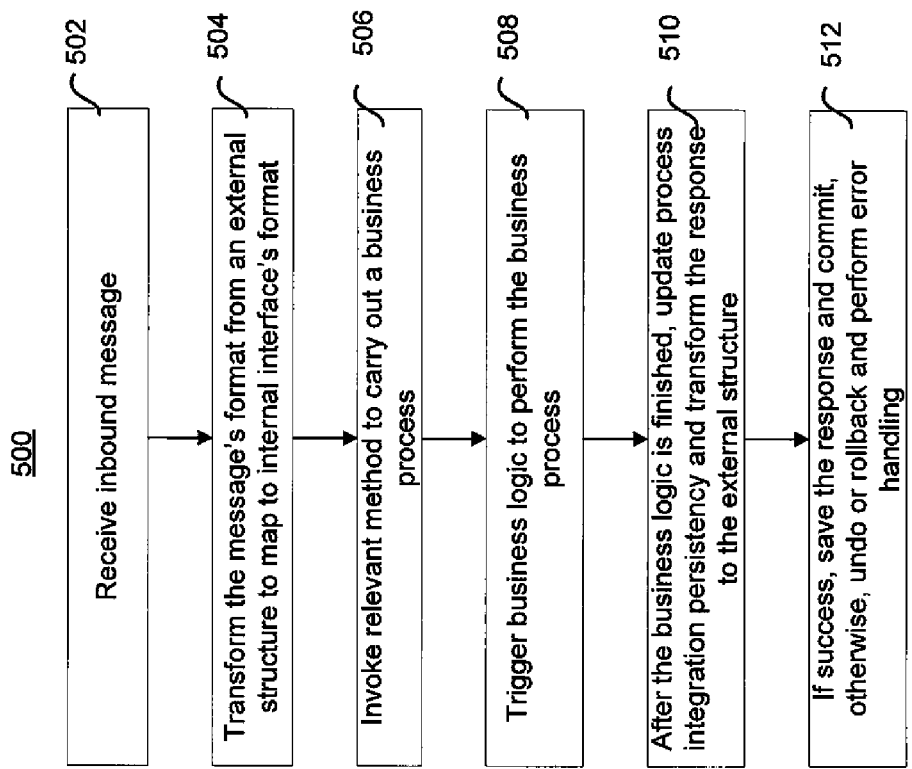
FIG. 5 illustrates a flow chart for inbound processing according to an exemplary embodiment.

FIG. 5 illustrates a flow chart 500 for an inbound communication processing according to an exemplary embodiment. At step 502, an inbound message may be received by a local process integration component. The inbound message may be received by a proxy and handed over by the proxy to a corresponding inbound adapter. The proxy may be provided for SOAP, RFC and IDOC services to ensure type safety and hide complexity regarding protocol specific technical details. The inbound adapter may get an instance of the relevant process broker from a process broker handler. In one embodiment, for asynchronous inbound processing, the inbound adapter may check sequence by checking a sequencing counter (e.g., invoking a checkSequence method implemented by the process broker handler). At step 504, the inbound adapter may transform the message's format from an external structure to map to the internal interface's format. At step 506, the inbound adapter may use the transformed message's request parameter to call a relevant method provided by the relevant process broker to carry out a business process. At step 508, the relevant process broker may trigger business logic to perform the business process (e.g., by actions or business query language (BQL) statements). At step 510, after the business logic is finished, the inbound adapter may update process integration persistency and transform the response to the external structure. Thereafter, at step 512, if the response is generated and transformed successfully, the inbound adapter may save the response and commit, otherwise, the adapter may undo or rollback the previous steps and perform error handling.

Figure 6:
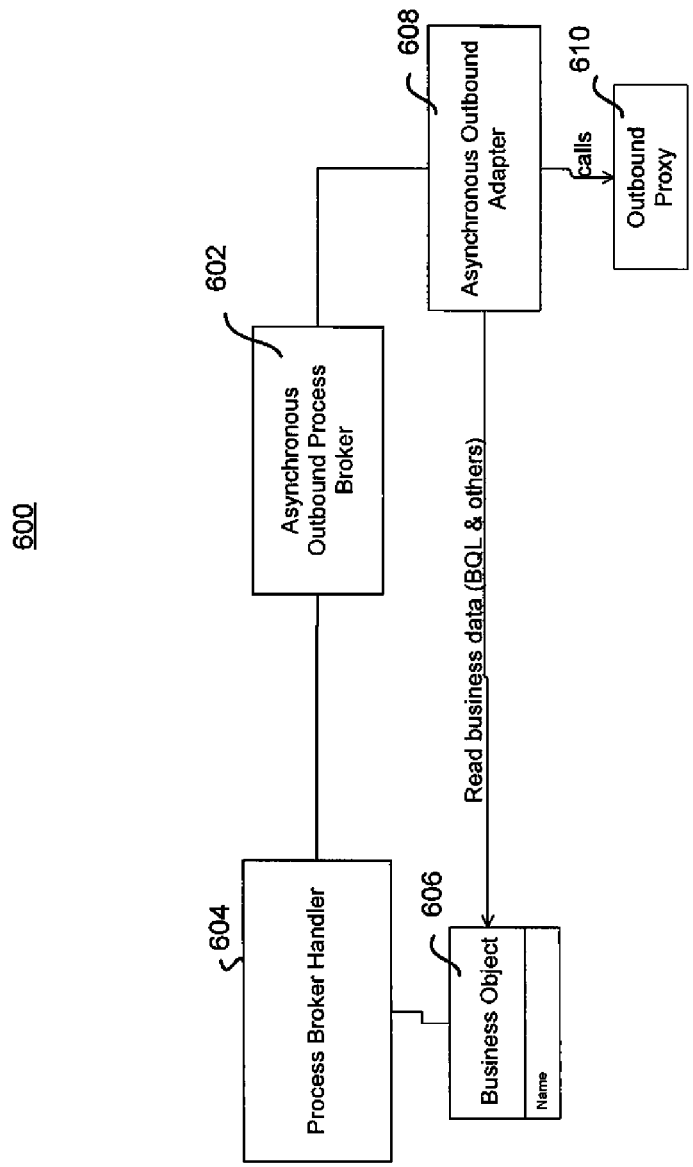
FIG. 6 illustrates a meta model for asynchronous outbound communication according to an exemplary embodiment.

FIG. 6 illustrates a meta model 600 for asynchronous outbound communication according to an exemplary embodiment. For asynchronous outbound communication, a transaction manager in the business logic (e.g., the business logic 220 of FIG. 2) may fire a generic event each time a transaction (or rather logical unit of work) is about to be completed, to trigger outbound process brokers for asynchronous communication. At this point in time, the business logic data may already have been checked without having been written to the database yet. In other words, it may be ensured that the data can be saved to the database, and the data is in its final form with all calculations performed, but everything can still be rolled back to the state before the start of the transaction.

The meta model 600 may comprise an asynchronous outbound process broker 602, a process broker handler 604, a business object 606, an asynchronous outbound adapter 608 and an outbound proxy 610. The asynchronous outbound process broker 602 may represent a plurality of brokers. The asynchronous outbound process broker 602 may register for interested events, for example, status attributes of business objects and save events of the transaction manager. The registration may be saved in a runtime storage (e.g., the configuration and runtime storage 242 of FIG. 2). The process broker handler 604 may listen to the events and changes in the business logic (e.g., status attribute changes of the business objects, and save events of the transaction manager). If one or more of the interested events occurs, the process broker handler 604 may trigger the asynchronous outbound process broker 602. In one embodiment, each asynchronous outbound process broker (e.g., the outbound process broker 602) may implement an interface containing at least an execute method. The process broker handler 604 may call this execute method and pass a transaction handler object as an input parameter. Accordingly, the asynchronous outbound process broker 602 may have access to changes of the current transaction. In one embodiment, status schema may be provided for the business objects that defines transition of status attributes.

The asynchronous outbound process broker 602 may be in charge of "if" and "what" shall be done with respect to process integration. This may include a process relevance check, actor/receiver/operation determination, error handling and process book-keeping. That is, the asynchronous outbound process broker 602 may implement all integration relevant logic that is independent of protocol specifics.

The asynchronous outbound adapter 608 may be responsible for the protocol specifics. All asynchronous outbound adapters implement a coarse grained "self-contained" interface that defines logical methods, e.g. createSalesOrder. The asynchronous outbound adapter 608 may implement this interface and may be called by the asynchronous outbound process broker 602 via the exposed interface. The asynchronous outbound adapter 608 may further implement logic to transform a message from internal to external format. The asynchronous outbound adapter 608 may read additional business logic relevant data directly from the business object 606. The business object 606 may use a transaction handler object or direct BQL statements to database to provide the relevant data. Once the transformation is completed, protocol specific proxies such as the outbound proxy 610 may be called to pass the message to a remote system. In one embodiment, a variety of proxies may be provided for service/SOAP, RFC and DOC. The proxies may ensure type safety and hide complexity regarding protocol specific technical details.

In one embodiment, in asynchronous outbound communication, the outbound process brokers and adapters may be called in the same LUW, and may have access to both the changed business data as well as the business data as valid on transaction start (before image). This is required for the determination of process integration relevance and message assembly. Knowing the before image may also be required in case of "deferred process integration" (a use case arising in master data replication processes, for example), although this typically requires different data access and recreation of the before image.

In one embodiment, the outbound process brokers and adapters may be responsible for handling communication and process integration errors. For example, if the outbound process broker 602 or the outbound adapter 608 encounter a severe error (system or resource failure, programming error), the entire transaction may be rolled back. If outbound process brokers (e.g., the outbound process broker 602) encounter a missing configuration, the transaction should not be aborted, though, but the assembled message may be stored and a task to resolve the error may be started.

Figure 7:
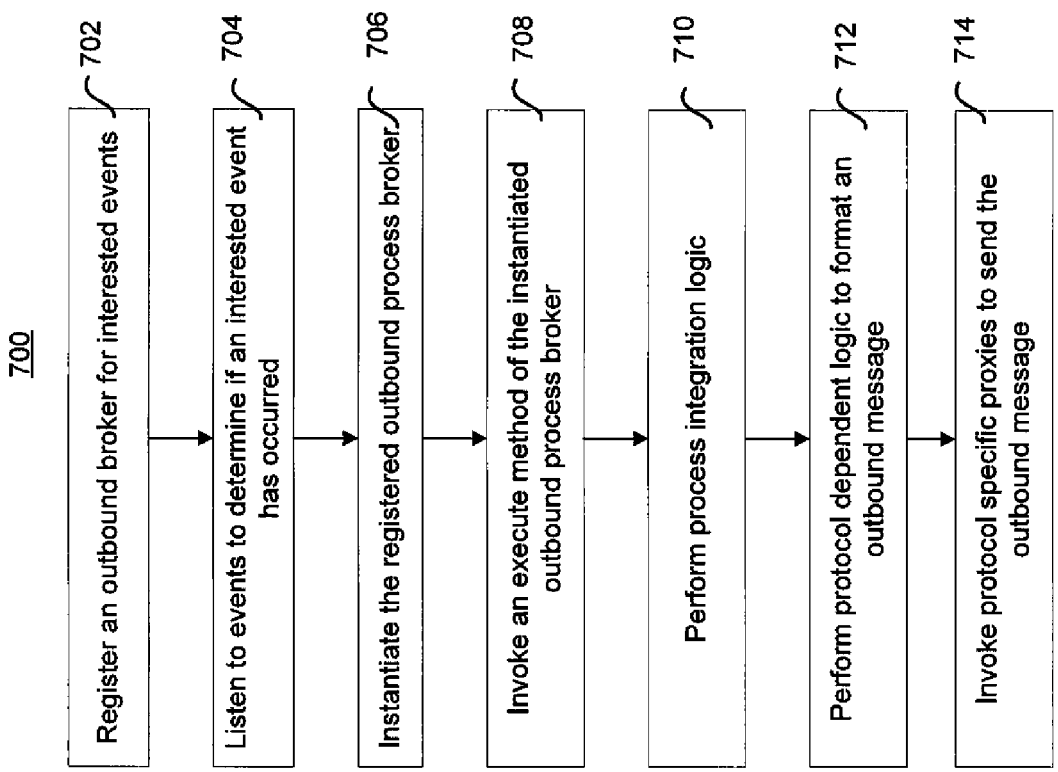
FIG. 7 illustrates a flow chart for asynchronous outbound processing according to an exemplary embodiment.

FIG. 7 illustrates a flow chart 700 for an asynchronous outbound communication processing according to an exemplary embodiment. At block 702, an outbound process broker may register for interested events. At block 704, an outbound process broker handler may listen to events to determine if an interested event has occurred. At block 706, once the process broker handler is notified of occurrence of the interested events, it may instantiate a registered asynchronous outbound process broker. At block 708, the process broker handler may invoke an execute method of the instantiated outbound broker. In one embodiment, a transaction handler may be passed as an input parameter for the execute method.

At block 710, the instantiated outbound process broker may perform process integration logic. The asynchronous outbound process broker may check additional conditions to decide whether an outbound communication shall be performed. Furthermore, it may filter business objects that are relevant for an integration scenario and may determine the technical receivers and relevant adapters. For this, process broker handler may read configuration data for the specific system landscape. In one embodiment, for optimization reasons, process integration persistency may be evaluated, e.g. if a communication to the remote system has already taken place, steps like receiver determination may be skipped.

At block 712, the outbound adapter may be triggered to perform protocol dependent logic to format an outbound message. If for message assembly, additional data are needed, the outbound adapter may access the transaction handler object or directly the database. At block 714, the protocol specific proxies may be used to send the assembled message to remote system(s).

Figure 8:
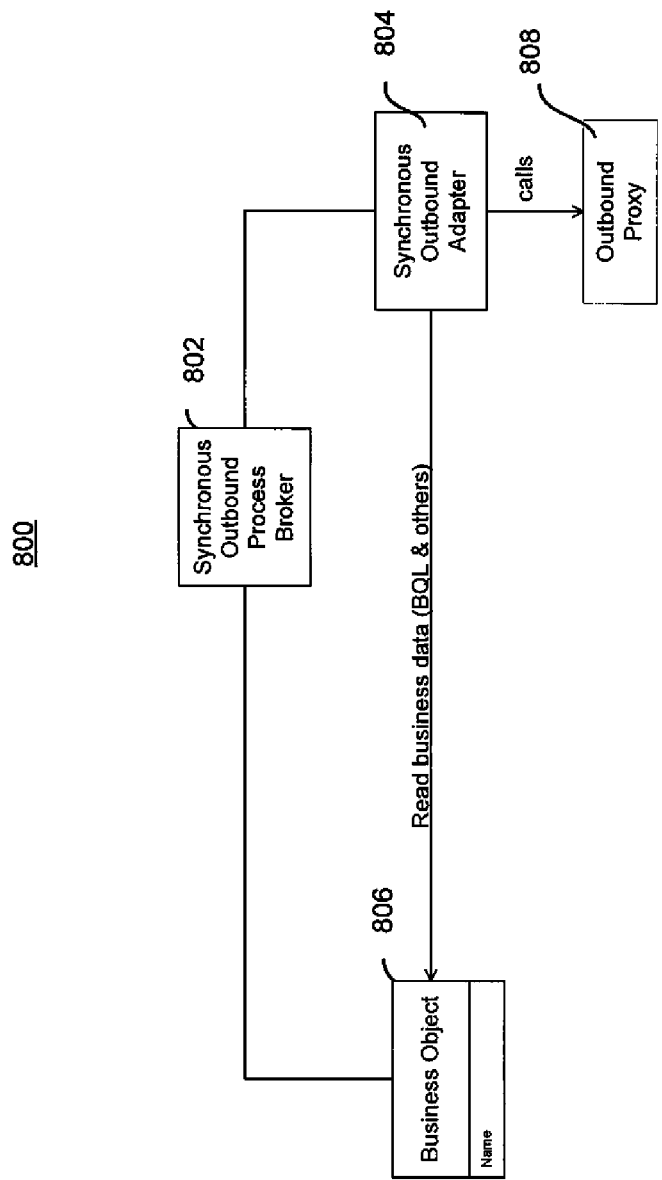
FIG. 8 illustrates a meta model for synchronous outbound communication according to an exemplary embodiment.

FIG. 8 illustrates a meta model 800 for synchronous outbound communication according to an exemplary embodiment. As synchronous calls are bounded close to business logic, explicit calls from business logic are proposed for synchronous outbound communication. The meta model 800 may comprise a synchronous outbound process broker 802, a synchronous outbound adapter 804, a business object 806 and an outbound proxy 808. The business object 806 may represent a plurality of business objects that implement the business logic of an application. The synchronous outbound process broker 802 may expose a coarse grained "self-contained" interface that contains logical methods, like createSalesOrder. Signature of the logical methods may be closely related to structures of business logic. Those methods may be called directly from the business logic with application specific request and response structures. For example, the business object 806 may call the outbound process broker 802 directly at any point of an active transaction when the business logic may determine as appropriate. The call may behave like a local method call. However, the called remote business logic may be executed in a separate LUW, even if it is deployed on the same Web Application Server (WAS) as the triggering business logic.

The synchronous outbound process broker 802 may be in charge of process integration such as, but not limited to, "if" and "what" need to be done for process integration. This may include determining actor/receiver, and process book-keeping. In one embodiment, the synchronous outbound process broker 802 may implement all integration relevant logic that is independent of protocol specifics.

The synchronous outbound adapter 804 may be responsible for protocol specifics. The synchronous outbound adapter 804 may be called by synchronous outbound process broker 802 using the exposed interface. All synchronous outbound adapters may also implement a coarse grained "self-contained" interface that defines logical methods, e.g. createSalesOrder. The synchronous outbound adapter 804 may read additional business logic relevant data from the business object 806 and may transform a message from an internal format to an external format. Once the transformation is completed, protocol specific proxies such as the outbound proxy 808 may be called by the synchronous outbound adapter 804 to pass the transformed message to remote system(s). Proxies may be provided for service/SOAP and RFC. In one embodiment, proxies may ensure type safety and hide complexity regarding protocol specific technical details.

In one embodiment, outbound process broker and adapter (s) may have to adhere to the standard contract of transactional integrity. For example, they may not perform immediate database updates. However, there may be exceptions that the outbound process broker and adapter(s) may update databases immediately for process logging, auditing, and or monitoring reasons.

In one embodiment, the business object 806 may be responsible for handling process integration errors. The outbound process broker 802 and adapter 804 may only have to detect communication and process integration errors, and signal them to the calling business logic (e.g., the business object 806). In another embodiment, an outbound process broker may decide whether an error can be tolerated from the perspective of the process integration case it is responsible for, and thus "hide" it from the business logic. Also note that if the business logic calls several synchronous outbound process integration steps that involve updates in the remote system(s), error handling in the business logic may becomes highly complicated and in this case, the asynchronous outbound communication may be used.

Figure 9:
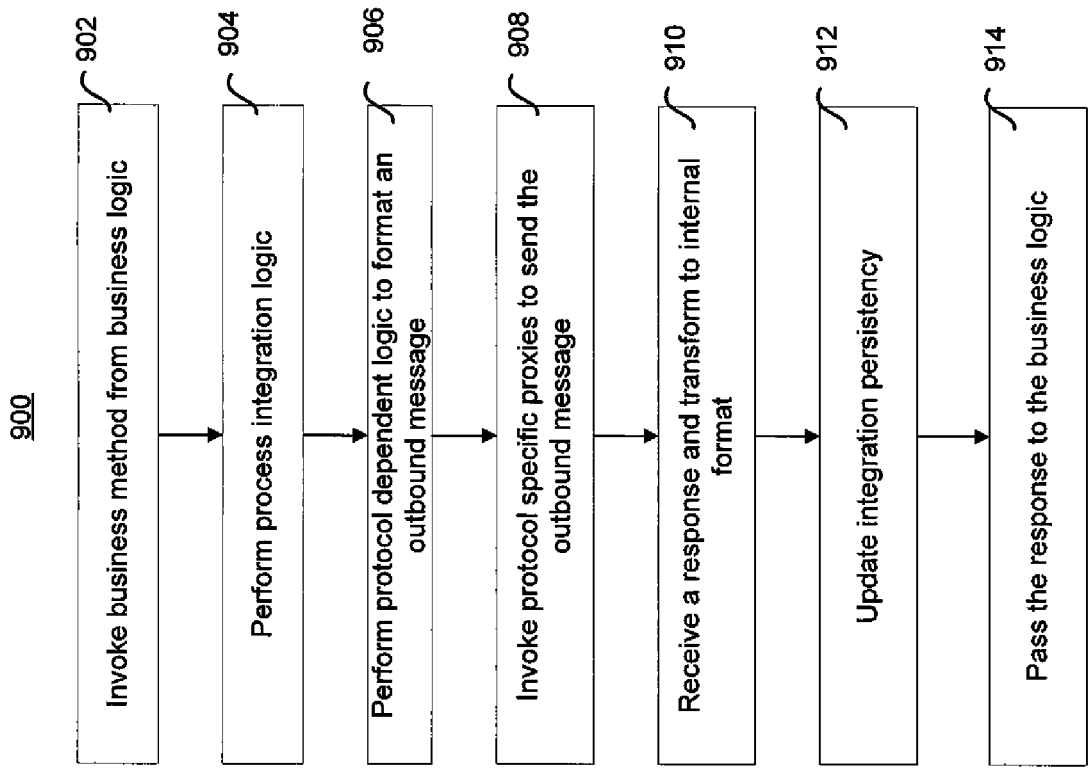
FIG. 9 illustrates a flow chart for synchronous outbound processing according to an exemplary embodiment.

FIG. 9 illustrates a flow chart 900 for synchronous outbound processing according to an exemplary embodiment. At block 902, a business method may be invoked by the business logic. The business logic may be a business object and the business method may be a method exposed by an outbound process broker handler. In one embodiment, the outbound process broker handler may be used as a factory to create an instance of relevant synchronous outbound process broker, so the business logic may directly call the relevant method of outbound process broker with corresponding request and response structures. At block 904, the outbound process broker may perform process integration logic. For example, the outbound process broker may determine actors (logical receiver) and technical receivers, and based on technical receivers may determine relevant adapters. During this process, the process broker handler may read configuration data for the specific system landscape. At block 906, an outbound adapter may be triggered to perform protocol dependent logic to format an outbound message. If message assembly required, additional data could be read. At block 908, the protocol specific proxies may be invoked to send the assembled message to remote system(s). At block 910, a response may be received and transformed to internal structure and transmitted to the synchronous outbound process broker. The synchronous outbound process broker may perform optional checks if necessary. At block 912, the process integration persistency may be updated in terms of process status information. At block 914, the response may be passed to business logic.

In one embodiment, the meta models of FIGS. 4, 6 and 8 and the communication processing illustrated by FIGS. 5, 7 and 9 may be implemented in a toolkit-generator approach. The inbound/outbound adapters may be responsible for the control flow while the process broker handlers may provide generic services (e.g., as a toolkit). The control flow orchestration may be uniformed by code generation (e.g., generator). The toolkit-generator approach for process integration may increase extensibility and flexibility of process integration by separation of business and integration logic, may harmonize development, configuration & monitoring for different channels (e.g. BAPI, DOC, SOA). The toolkit-generator approach for process integration may also support evolution from point-to-point to middleware based mediated communication and may provide dedicated solution for synchronous & asynchronous communication. Further, the toolkit-generator approach for process integration may support model-based development, configuration & monitoring. Moreover, the toolkit-generator approach for process integration may have lean and simple core that can be extended on application demand, may reflect comprehensive concepts in application code not hidden in framework and may provide dedicated solution for error handling, extensibility, event handling, routing and mapping.

In one or more embodiments, the interfaces may be defined in an object oriented programming language (e.g., C++, Java, Advanced Business Application Programming (ABAP)). And the data objects implementing these interfaces, such as the process broker handler and adapters may be implemented in the object oriented programming language as well. In one embodiment, the adapters may also be referred to as backend adapters.

Figure 10:
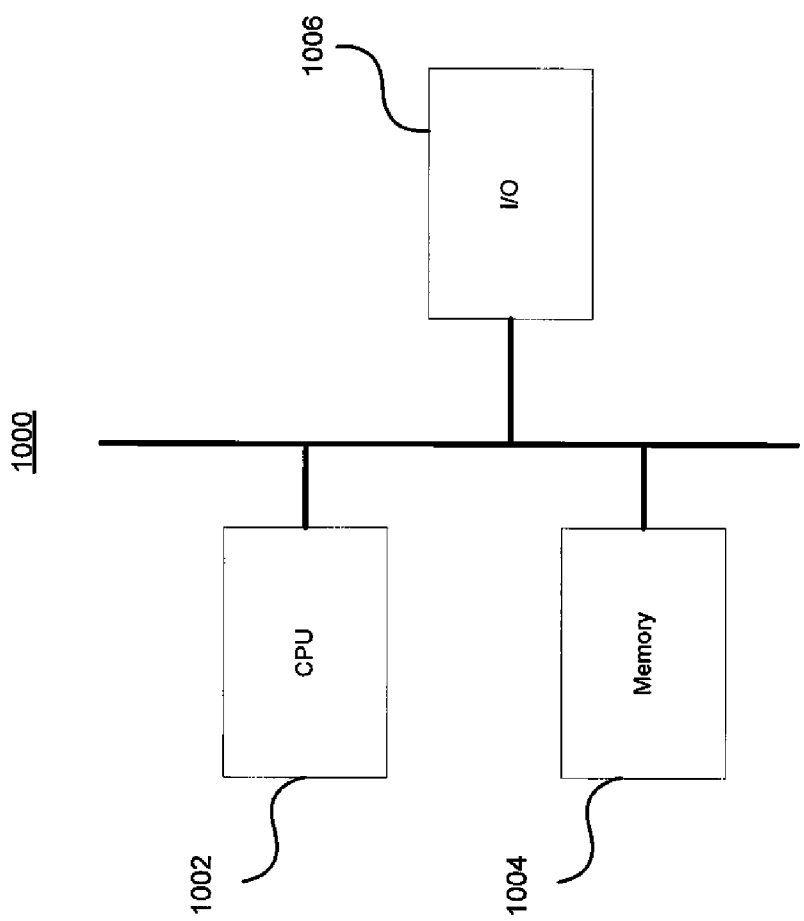
FIG. 10 depicts a structure of a computing device according to one embodiment of the invention.

FIG. 10 depicts a structure of a computing device 1000 according to one embodiment of the invention. The computing device 1000 may includes a processor 1002, memory 1004, and an I/O device(s) 1006. The processor 1002 is connected to the memory 1004 and I/O device(s) 1006. These connections are direct or via other internal electronic circuitry or components.

The processor 1002 is a programmable processor that executes instructions residing in the memory 1004 to receive and send data via the I/O device(s) 1006. The instructions may perform the operations of the application context and rule based UI control described herein. The term programmable processor as used herein is any programmable microprocessor or processor or combination of microprocessors or processors that can operate on digital data, which may be special or general purpose processors coupled to receive data and instructions from, and to transmit data and instructions to, a machine-readable medium. According to one embodiment of the present invention the processor 1002 may be an INTEL microprocessor or a mobile CPU.

Memory 1004 is a machine-readable medium that stores data that is processed by processor 1002. The term machine-readable medium as used herein is any addressable storage device that stores digital data including any computer program product, apparatus and/or device (e.g., a random access memory (RAM), read only memory (ROM), magnetic disc, optical disc, programmable logic device (PLD), tape, hard drives, RAID storage device, flash memory or any combination of these devices). This may include external machine-readable mediums that are connected to processor 1002 via one or more I/O device(s) 1006.

The I/O device(s) 1006 may include one or more input/output devices (e.g., a touch screen, a network adapter) and interfaces that receive and/or send digital data to and from an external device. Interfaces as used herein are any point of access to an external device where digital data is received or sent, including ports, buffers, queues, subsets thereof, or any other interface to an external device.

Figure 11:
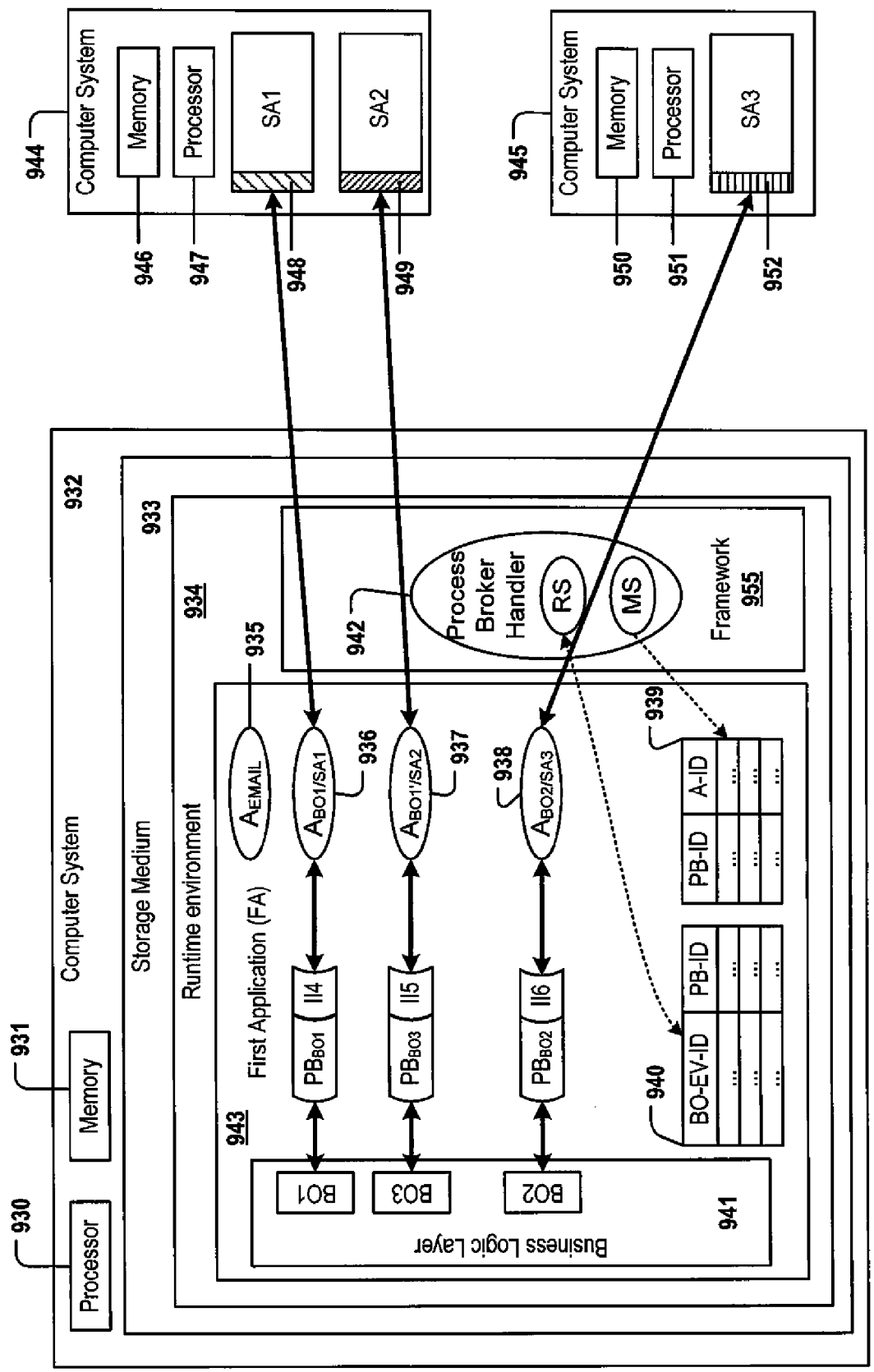
FIG. 11 depicts a block diagram of a data processing system according to a further exemplary embodiment.

FIG. 11 depicts a block diagram of a data processing system according to a further exemplary embodiment. A first computer system 932 comprises a storage medium 933, memory 931 and a processor 930 for processing instructions stored on the storage medium 933. The computer system hosts a runtime environment 934 for process integration. In the depicted embodiment, program logic and/or business data provided or required by the business logic layer 941 of a first application 943 shall be integrated with program logic and/or data provided or required by one of a plurality of second application programs SA1, SA2, SA3. Such a runtime environment can be, for example, a Java runtime environment or an ABAP web application server. The runtime environment comprises a framework 955 hosting a process broker handler 942 which is operable to instantiate the process brokers PBBO1-PBBO3 and corresponding adapters 935-938. The process broker handler may have access to a first mapping 940 for determining the process broker having registered for an event of or being otherwise assigned to one of the business objects. The process broker handler may also have access to a second mapping 939 for determining an adapter being operable to transform data of said business object handed over by the determined process broker into a format required by the interface 948, 949, 952 of an external application program, herein also referred to as 'second application' SA1-SA3. The second application program to receive the message is also determined by the process broker handler 942 when executing a routing service RS. The second applications may be hosted by one or more remote computer systems 944, 945 being connected to the computer system 932 hosting the first application via a network (not shown). Each of the remote computer systems 944, 945 having a respective memory 946, 950 and a respective processor 947, 951. These specific interaction of process brokers and adapters being part of the first application with the process broker handler being part of the framework 955 as specified in the independent and the dependent claims may provide for an overall system architecture being particularly suited for creating complex first application programs which can be easily integrated to the program logic of one or more second applications and/or which can easily integrate data and services provided by any of said second applications.

Figure 12:
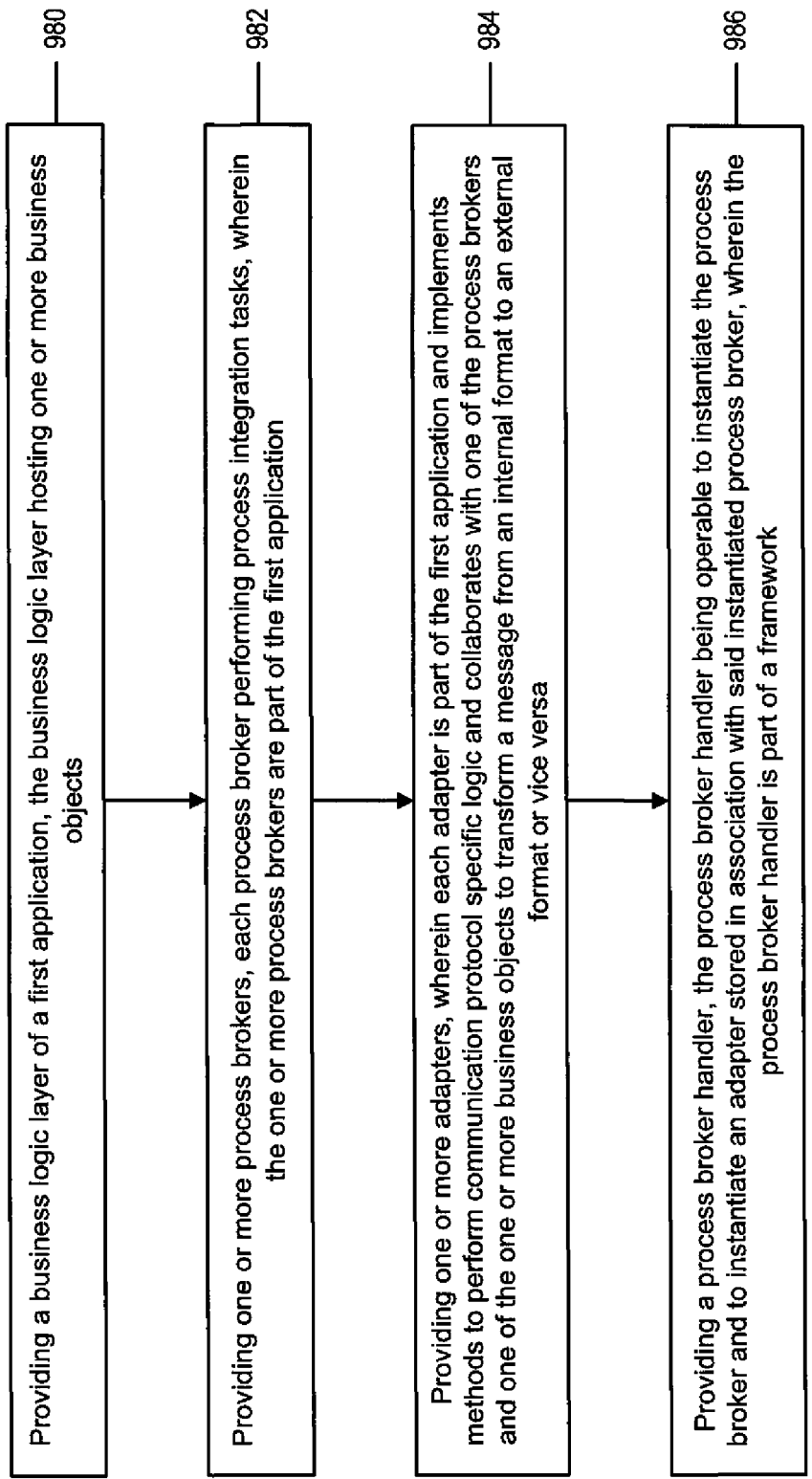
FIG. 12 depicts a flow chart of a method according to a further exemplary embodiment.

FIG. 12 depicts a flow chart of a method according to a further exemplary embodiment. In step 980, a business logic layer 941 of a first application 943 is provided. The business logic layer hosts one or more business objects BO1-BO3. In step 982, one or more process brokers $PB_{BO1}$-$PB_{BO3}$ are provided. Each process broker performs process integration tasks. The one or more process brokers are part of the first application. In step 984, one or more adapters are provided. Each adapter is part of the first application and implements methods to perform communication protocol specific logic. Each adapter is operable to collaborate with one of the process brokers and to collaborate with/interpret one of the one or more business objects in order to generate a message and and/or to transform a message from an internal format to an external format or vice versa. In step 986, a process broker handler is provided. The process broker handler is operable to instantiate the process broker and to instantiate an adapter stored in association with said instantiated process broker. The provided process broker handler is part of the framework 955.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

The invention claimed is:

1. A computer implemented method for process integration, the method comprising the steps of:
    providing, by a processor, a business logic layer hosting one or more business objects, the business logic layer being part of a first application;
    providing, by a processor, process brokers, each of the process brokers performing process integration tasks by dynamically determining whether, when or how routines of the business logic layer are integrated with routines of a second application, wherein the process brokers are part of the first application;
    providing, by a processor, one or more adapters, wherein each adapter is part of the first application and implements methods to perform communication protocol specific logic, wherein each adapter is interoperable with at least one of the process brokers and one of the business objects to transform a message exchanged between the process broker and the second application from an internal format to an external format or vice versa, the internal format being interpretable by the process broker, the external format being interpretable by the second application, wherein the adapters are part of the first application;
    providing, by a processor, a process broker handler, the process broker handler being operable to instantiate the process broker and to instantiate one of the adapters stored in association with the process broker, wherein the process broker handler is part of a framework, the framework being part of a runtime environment, the runtime environment hosting the first application;
    receiving the message from the second application via an interface of an inbound adapter, the receiving inbound adapter being one of the one or more adapters;
    transforming, by the receiving inbound adapter, the external format of the received message to internal format required by an internal interface of an inbound process broker, the inbound process broker being one of the one or more process brokers;
    transferring the transformed message from the receiving inbound adapter to the inbound process broker;
    invoking, by the inbound process broker, a business method of one of the business objects;
    performing, by the inbound process broker, error handling and process book-keeping of the invoked business method;
    notifying, by the receiving inbound adapter, the process broker handler on the receipt of the message; and
    controlling, by the receiving inbound adapter, a processing of the received message and integration of the received message into the business logic layer;
    wherein process integration is achieved by one of the adapters and a corresponding process broker by:
    in case the message is an inbound message, using message data transformed to the internal data format to modify at least one of the business objects;
    in case the message is an outbound message, transforming data of the at least one business object from the internal to the external format and sending the data as the message to the second application, and
    wherein each adapter is dynamically assigned with the process brokers and implements integration logic, such that business logic of the business logic layer is decoupled from the integration logic.

2. The computer implemented method of claim 1, further comprising the steps of:
    providing, by the framework, an abstract broker class,
    for developing the first application, using the abstract broker class as superclass from which the one or more process brokers inherit methods, method subs, or constants;
    wherein the method further comprises the step of:
    providing a toolkit library comprising generic adapters or utility classes, a generic adapter being an adapter for transforming the internal message format to and/or from a generic external format, the generic external format being used by more than two second application programs for communication, the utility classes assisting at least one of the adapters and/or process brokers in executing their tasks; and
    for developing the first application, including one of the generic adapters and/or utility classes into the first application.

3. The computer implemented method of claim 1, wherein the process broker handler implements a plurality of process integration services including a routing service (RS) and a mapping service (MS), the routing service being adapted for automatically determining to which of a plurality of second application programs an outgoing communication is to be directed, the mapping service being adapted for determining, for the determined second application program, the external format required by the determined second application program for interpreting the message, wherein the process broker handler is operable to dynamically instantiate one of the one or more process brokers and one of the one or more adapters in dependence on a dynamically generated result of the routing service and the mapping service.

4. The computer implemented method of claim 1, wherein for executing inbound communication one of the adapters is responsible for controlling a sequence and type of data processing operations of the inbound communication.

5. The computer implemented method of claim 1, wherein for asynchronous outbound communication the following steps are executed:
    registering, by one or more outbound process brokers belonging to the one or more process brokers, for one or more events thrown in the business logic layer, each registering outbound process broker comprising an execute method;
    listening, by the process broker handler, to the one or more events to determine whether any of the events has occurred;
    when any of the events occurs, determining, by the process broker handler, the at least one outbound process broker having registered for the occurred event and
    determining, by the process broker handler, an outbound adapter being operable to transform the message from the internal format of the determined outbound process broker to the external format of the second application program, the outbound adapter being one of the one or more adapters;

invoking, by the process broker handler, the execute method of the determined outbound process broker;

invoking, by the outbound process broker, a method of the determined outbound adapter, the invoked method creating the message to be sent to the second application program from business logic layer data; and performing, by the determined outbound process broker, error handling and process book-keeping when the adapter creates and transforms the message.

6. The computer implemented method of claim 5, further comprising the steps of:

when invoking the method of the determined outbound adapter, forwarding, by the outbound process broker, a pointer to a business object having thrown an occurred interested event, and accessing, by the outbound adapter, the business object via the pointer to retrieve data of the business object used for creating the message.

7. The computer implemented method of claim 6, wherein interested events are selected from a group comprising: a status attribute change event of the business object, and a save event of a transaction manager, the transaction manager being part of the business logic layer and being responsible for managing transactions executed in the business logic layer, each save event being an event of storing data provided by business logic to a storage medium.

8. The computer-implemented method of claim 7, wherein the process broker handler instantiates the determined outbound process broker and the determined outbound adapter in case an interested event occurs.

9. The computer implemented method of claim 1, the method for executing a synchronous outbound communication further comprising the steps of:

invoking, via a call submitted by a routine of the business logic layer to an internal interface of one of a plurality of outbound process brokers, a method of the one outbound process broker, upon receipt of the call, invoking, by the one outbound process broker, a method of one of a plurality of outbound adapters, thereby causing one of the outbound adapters to generate the message by transforming data of the business object submitted with a request into the external format.

10. The computer implemented method of claim 9, wherein for executing an outbound communication one of the outbound process brokers is responsible for controlling a sequence and type of data processing operations of the outbound communication.

11. The computer implemented method of claim 1, wherein data processing is uniformed by code templates, each code template being selected from a group consisting of:

a code template for a synchronous outbound adapter,
a code template for a synchronous inbound adapter,
a code template for an asynchronous outbound adapter,
a code template for an asynchronous outbound adapter,
a code template for a synchronous outbound process broker,
a code template for a synchronous inbound process broker,
a code template for an asynchronous outbound process broker,
a code template for an asynchronous outbound process broker,
a code template for an assignment manager, the assignment manager providing means for assigning at least one process broker to one adapter wherein a mapping service of the process broker handler is operable to access the assignment for determining a required adapter.

12. A processing system for process integration, the processing system comprising:

a runtime environment, the runtime environment comprising a framework;

a first application comprising a business logic layer, the business logic layer being operable to host one or more business objects, the runtime environment being operable to host the first application;

process brokers, each of the process brokers being operable to perform process integration tasks by dynamically determining whether, when or how routines of the business logic layer need to be integrated with routines of a second application, wherein the one or more process brokers are part of the first application;

one or more adapters, wherein each adapter is part of the first application and implements methods to perform communication protocol specific logic and is interoperable with at least one of the process brokers and one of the one or more business objects to transform a message exchanged between the process broker and the second application from an internal format to an external format or vice versa, wherein the process broker is operable to interpret the internal format and wherein the external format is interpretable by the second application, wherein the one or more adapters are part of the first application; and a process broker handler, the process broker handler being operable to instantiate the process broker and one of the adapters stored in association with the instantiated process broker, wherein the process broker handler is part of the framework, the framework being part of the runtime environment;

a memory to store computer program instructions;

a processor configured to execute the computer program instructions, thereby providing the runtime environment and the first application;

an inbound adapter being operable to receive the message from the second application via an interface of the receiving inbound adapter, the receiving inbound adapter being one of the one or more adapters; and the receiving inbound adapter being operable to transform the external format of the received message to internal format required by an internal interface of an inbound process broker, the inbound process broker being one of the one or more process brokers, the receiving inbound adapter transferring the transformed message to the inbound process broker;

wherein the inbound process broker invokes a business method of one of the business objects and performs error handling and process book-keeping of the invoked business method;

wherein the receiving inbound adapter notifies the process broker handler on the receipt of the message and controls a processing of the received message and integration of the received message into the business logic layer;

wherein in case the message is an inbound message, the adapter and the process broker interoperatively are operable to use the message data transformed to the internal data format to modify at least one of the business objects;

wherein in case the message is an outbound message, the adapter and the process broker interoperatively are operable to transform data of the at least one business object from the internal to the external format and is adapted for sending the data as the message to the second application, and wherein each adapter is dynamically assigned with the process brokers and implements integration logic, such that business logic of the business logic layer is decoupled from the integration logic.

\* \* \* \* \*